Figure 1:
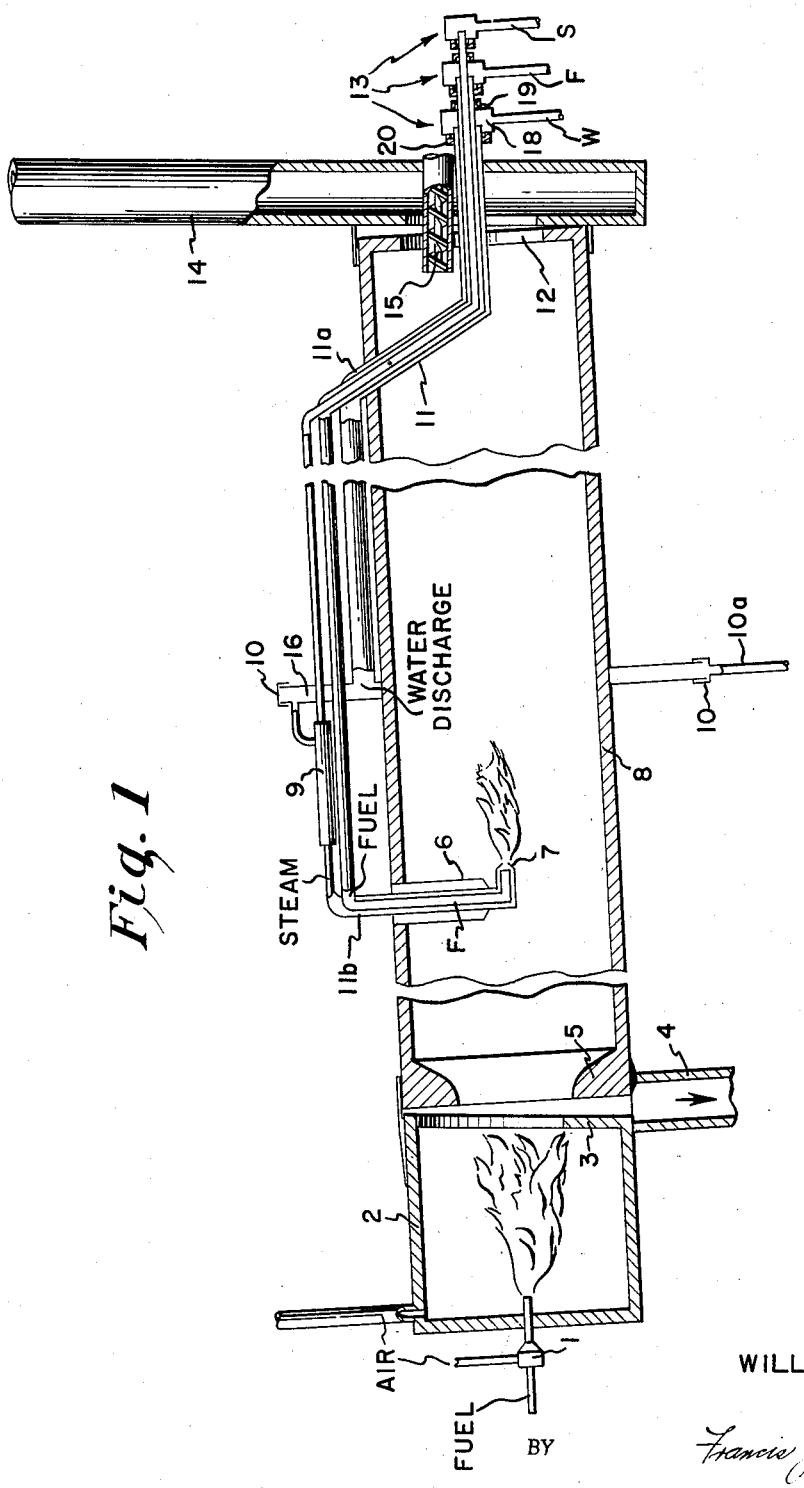

Dec. 23, 1958 W. D. ROSS 2,865,622
PRODUCTION OF PIGMENTS
Filed Aug. 30, 1955 2 Sheets-Sheet 1

INVENTOR
WILLIAM D. ROSS
BY Francis J. Crowley
ATTORNEY

United States Patent Office 2,865,622
Patented Dec. 23, 1958

2,865,622

PRODUCTION OF PIGMENTS

William D. Ross, Wilmington, Del., assignor to E. I. du Pont de Nemours and Company, Wilmington, Del., a corporation of Delaware Application August 30, 1955, Serial No. 531,557

10 Claims. (Cl. 263—33)

This invention pertains to an apparatus and process for calcining heat sensitive particulate solids, especially titanium dioxide pigments.

One of the most widely used processes for preparing titanium dioxide pigments involves the calcining of a hydrated precipitate of titanium dioxide that is obtained from a sulfated solution of the ilmenite ore. The most efficient and economical calcining devices for this procedure are direct fired, rotary kilns. In this type of kiln, the combustion gases pass directly through the rotating kiln containing the pigment material, thus achieving economy of heat. Large tonnages are calcined in this manner, and it is, of course, desirable to handle as much material as possible in a minimum of time.

However, in obtaining maximum capacity in the calcination of titanium dioxide pigments, the following problems are encountered: there is danger of overburning and forming grit in the pigment; very troublesome dust losses can occur when the gas velocities within the kiln become excessive; the final pigment temperature must be carefully controlled in order to develop optimum pigment properties; an oxidizing atmosphere throughout the kiln is required to prevent a deposition of discoloring carbon, and also to prevent reduction of the pigment which would result in an undesirable bluish white color; a problem of heat input along the length of the kiln is incurred; and contamination from the corrosion of auxiliary metal equipment in contact with the pigment presents a serious problem. These problems are discussed in more detail in the ensuing paragraphs.

Overburning is an undesirable result of calcining at too high a temperature. The final calcination temperature (i. e., the maximum calcination temperature) for titanium dioxide pigments is in the range of from 800–1200° C., depending upon the grade. In most operations, the temperature is between 800 and 1000° C. At times, this temperature must be maintained within tolerances as small as + or —5° C. Consequently, it is harmful to allow the temperature of the hot gas which contacts such a heat sensitive pigmentary material at its final calcination temperature to be very much above that of the pigment. If the gas temperature becomes too high, isolated particles or lumps of the pigment projecting into the gas stream or adhering to the calciner walls are overburned, resulting in the formation of a hard, gritty material and a general degradation of the pigment properties. In order to achieve this careful control, a delicate balance of operations must be maintained which involves the supply of fuel and air, rate of feed of the raw pigment, progress of the material through the kiln, and control of the heat losses from the kiln to the outside atmosphere.

Present day calciners for titanium dioxide production are designed with a stationary combustion chamber at the discharge end of the kiln. The source of heat is from the combustion of conventional fuels, such as fuel oil, water gas, or petroleum gases. The flame is not permitted to enter the kiln since the pigment closest to the combustion chamber is either at or near final calcination temperature, and the high temperature of the flame would cause overburning. Furthermore, undiluted combustion gases cannot be introduced directly into the kiln because of their high temperatures. For this reason, it has been the practice to add excess air to cool the gases before they pass into the kiln. Some of the air is supplied by using an excess when burning the fuel, and still more air may be introduced into the combustion chamber by a separate line. The air-combustion gas mixture is admitted to the hot end of the kiln at temperatures which are usually not more than 200° C. above the final pigment temperature. The air which cools the combustion gases also supplies the oxygen necessary to maintain a non-reducing atmosphere within the kiln. In calcining $TiO_2$ containing pigmentary materials the air used is more than double the amount required for complete combustion of the fuel.

Since all of the heat in the conventional kiln is generated in the external combustion chamber and then introduced into the hot end of the kiln at a strictly limited temperature, there arises a problem of transferring sufficient heat along the kiln to the cooler parts of the charge without overburning the material at the hot end. The magnitude of this problem is appreciated when it is realized that a large portion of the heat input is required in the cooler half of the kiln to supply the latent heat of evaporation necessary for removal of the water usually present in kiln feed of this type. In certain other applications this distribution of heat toward the cold end of the kiln is accomplished by using a minimum of oxygen for combustion which will elongate the flame so that it reaches well down the length of the kiln. However, this practice is impossible where it is necessary to maintain an oxidizing atmosphere. Another method of carrying the heat further up the kiln is to use a larger excess of secondary air. However, this procedure is limited since a velocity is reached where the gases are carrying an excessive amount of pigment fines out the stack. Furthermore, this method increases the heat loss through the stack.

Another problem of importance is one of pigment contamination due to the corrosion of any steel or other metallic members located within the kiln passage. The oxidizing atmosphere plus the acid fumes arising from the pigment make it very difficult to install auxiliary heating devices within the kiln itself. This is particularly true of $TiO_2$ pigments which are extremely sensitive to small amounts of heavy metals.

Although satisfactory pigments are made in large quantities by means of rotary calciners having the external combustion chamber as the sole source of heat, it has heretofore been impossible to increase the rate of production, or throughput, in these kilns without suffering the consequences of either overburning or excessive dust losses. The present invention introduces a solution to these problems by providing a method of introducing additional heat at the mid-portions of the kiln without encountering additional dust losses, overburning, contamination, chemical reduction, or excessive heat loss.

The process of my invention comprises passing a heat sensitive pigmentary material through a horizontally inclined rotary kiln from its relatively cool raised end, passing into the low end and through said kiln hot combustion gases and sufficient air to have a gas mixture at about the maximum gas temperature for the calcining process and simultaneously introducing a fluid fuel into the gas space within the kiln at a point adjacent to which the charge is substantially below the maximum calcination temperature and burning it in the stream of oxygen-containing gases coming from the combustion chamber. The fuel is introduced through a feed line protected by cooled jackets. The quantity of fuel introduced into the kiln is regulated so that only a portion of the oxygen in the gas stream is consumed. The uncombined oxygen is allowed to pass through the kiln for the purpose of maintaining an oxidizing atmosphere throughout its length. The amount of air which is supplied in a controlled temperature calcining process using a non-reducing atmosphere usually ranges from about 125 to 175% more than is theoretically required for combustion. The theoretical ratio of air to the usual hydrocarbon fuel is approximately 16:1 on a weight basis. The amount of fuel which may be introduced into the kiln will depend upon the location of the burner, the maximum calcining temperature for the material, the necessity for leaving sufficient oxygen to maintain a non-reducing atmosphere and the rate of throughput of the charge. The optimum quantity of fuel for a particular material can be readily determined by one skilled in the art. For many materials which use the calcining process of this invention, the fuel may be introduced into the kiln in amounts which range up to 100% of the thermal equivalent used in the combustion chamber adjacent to the low end of the kiln. A preferred zone for the introduction of the fuel is in the gas space where the pigment charge has attained not more than about 60% of its total temperature rise.

One of the unique features of this process is that the air stream can be used to cool the combustion gases entering the kiln, and then after it has performed this function, it can be used to supply the oxygen necessary to burn the fuel. As already explained, the air is used not only to cool the combustion gases, but also to provide an oxidizing atmosphere. However, much more air is required for cooling than is necessary to maintain the oxidizing atmosphere. As the air-combustion gas mixture passes along the kiln, it loses its heat to the pigment, and an area is reached where more heat could be used if it could be properly supplied. This invention accomplishes this need by supplying auxiliary fuel in this area, and using the excess air, which is not necessary for the oxidizing atmosphere, to burn the fuel. By making use of the air in this manner, rather than supplying air from an outside source, the gas velocity is not increased to a point where an excessive amount of fines are entrained in the gas stream and carried out the stack.

When calcining hydrated titanium dioxide from the sulfate process, the interior atmosphere of the kiln will contain considerable amounts of sulfur products which are extremely corrosive towards the metal at calcining temperatures. Because of this difficulty, it is not possible to insert conventional combustion devices within the kiln since they deteriorate rapidly and contaminate the pigment with objectionable impurities. The apparatus of my invention overcomes this problem. This is accomplished by a novel construction which exposes a minimum of the apparatus to the corrosive atmosphere and which also provides a unique cooling system for the portion of the fuel line which must be exposed to this atmosphere. The fuel line initially enters the rotating kiln through the raised end, and it is positioned along the longitudinal axis of the kiln. This feed line extends into the kiln a short distance beyond the charging mechanism which also enters the kiln at the same end, and then said line bends at a sharp angle and passes out through the wall of the kiln to keep it away from the corrosive atmosphere. At a point just beyond the outside wall the line again bends and runs longitudinally along the outside of the kiln until it again passes through the kiln wall and into the interior area where it is desired to burn the fuel. A conventional type of burner nozzle is usually used at the end of the fuel line. The cooling of the line is accomplished by means of concentric conduits. At the raised end of the kiln where the fuel line initially enters, there are three concentric pipes. The innermost pipe carries steam while the second concentric pipe carries the fuel and the outside line carries water. The water keeps the exterior surface of the conduits below about 100° C. and preferably at a temperature which is sufficiently low to condense some of the water vapor which is passing through the kiln together with the combustion gases, air and a sulfuric acid mist. The condensed water vapor serves to dilute the sulfuric acid in the vicinity of the conduit, thereby minimizing the corrosion of the pipes by the acid. As soon as the concentric pipes pass through the wall of the kiln to the outside, they separate into three individual lines. The water line runs into a circumferential trough attached to the exterior of the kiln, and it empties into a drain underneath the kiln. The steam and fuel lines continue longitudinally along the exterior wall, and they again become concentric just before they pass through the wall and into interior area of the kiln where combustion takes place. The fuel line is encased by the steam line which is in turn encased in a larger, corrosion-resistant metal jacket. This jacket protects the conduits from the corrosive atmosphere of the kiln, and it is so constructed that the fuel and steam lines can pass through the wall of the jacket and connect with a burner nozzle.

The steam serves as a cooling medium for the jacket and the conduits, and then it is subsequently used to atomize the fuel and make the flame turbulent. The steam cools the outside metal jacket a sufficient amount to keep corrosion at a minimum, but the temperature is not so low as to have corrosive gases condense upon it. The amount of steam which is necessary to cool the jacket will vary somewhat depending upon calcining conditions and the material used in the metal jacket, since some metals must be kept cooler than others to minimize corrosion. However, the amount of steam which is introduced into the kiln is relatively small, and it will not result in any substantial increase in gas velocity. In Examples I and II which follow, the quantity of steam is approximately equal in weight to the fuel introduced into the kiln. This quantity is small when considered in relation to the 16:1 air-fuel ratio, and the fact that a 160% excess of air is passing through the kiln. Other suitable cooling fluids which could be employed include air, nitrogen, gaseous hydrocarbons, and other gases. However, steam is preferred because of its low cost and its high heat capacity. Atomization of the fuel by the steam can be accomplished with conventional mixing nozzles which may be placed at a point where the temperature of the kiln is above the ignition temperature of the fuel, but this is not necessary since a pilot flame or electrical igniters may be used to kindle this auxiliary flame.

Figure 1 shows a cross sectional elevation of the essential features of a rotary kiln which will carry out the method of this invention. The kiln proper is composed of the steel shell 8 suitably mounted on trunnions and equipped with the rotating gear drive and lined with insulating and acid resistant brick. It is slightly inclined from the horizontal to cause the pigment to flow from the higher to the lower end as it rotates. The lower end is open and placed in communication with the outlet port of the stationary combustion chamber 2. This combustion chamber is usually supplied with a fire brick baffle 3 raised to a point high enough to protect the discharging pigment from the direct heat of the flame. The burner 1 is usually of the air-oil or gas-air type, and it provides the primary source of heat. Additional air is admitted to the combustion chamber as indicated in the drawing, or it may be drawn in at the joint between the rotating kiln and the combustion chamber or through the pigment discharge port 4. A small dam at the low end of the kiln 5 retains the pigment at a desired depth at the hot end. The combustion gases and water and acid fumes from the kiln pass through the upper end which is open at 12 and then up the stack 14. The raw pigment, usually wet, is fed from a filter by way of screw feed 15 into the upper end of the kiln. The concentric three duct conduit 11, having its outer member made of a nickel-molybdenum alloy steel, communicates with sources of water, fuel and steam through rotary seals 13 with water W flowing in the outer annular duct and steam S in the inner duct, and fuel F in the remaining duct. Packing glands 19 and 20 maintain a seal between the stationary chamber 18 and the rotating conduit. The other rotary seals are similarly mounted. The concentric conduit is divided into separate lines outside the shell of the kiln in order to empty the water into the circumferential trough 16. The separator 9 removes condensed water from the steam and discharges it, along with the cooling water, into drain 10a on the stationary circumferential cover 10 for the trough 16. The steam and fuel lines are then recombined at a point of assembly 11b for entry into the kiln as a two duct concentric unit 6 leading to the spray tip 7, the steam being around the fuel line F. A 310 stainless steel shell 6 enclosing an air space around the steam jacket is provided, and it is maintained above the acid dew point but below gaseous corrosion temperature by virtue of the limited heat transfer across the air space to the cooler steam jacket. The concentric conduits preferably turn toward the cold end of the kiln at a point near the longitudinal axis of the kiln and terminate together in openings adapted to discharge the steam and fuel along intersecting paths. Thermocouples are usually inserted through the kiln wall and located in the combustion chamber for the purpose of measuring and controlling the pigment temperature during its progress through the kiln. The fuel and steam conduits may be of ordinary or stainless steel. However, the outer member of the concentric assemblies which are exposed to the kiln gases should be made of high temperature, corrosion resistant material, such as 310 stainless steel or nickel-molybdenum alloy steels. When handling TiO₂ pigment, care should be used in selecting the chrome alloy steels because of the potency of chromium compounds as discoloring impurities. 310 stainless steel has proved satisfactory for the outer member 6 of the burner assembly. It is frequently best to make the entire assembly such as the concentric burner unit of the same alloy for simplicity in construction and thermal stability. This figure shows additional fuel being added at one point in the kiln. However, fuel may be similarly introduced at other locations so that the heat of combustion is directed toward the space which is at least 3 or 4 kiln diameters from each end depending upon the adjacent pigment temperature. The additional fuel and steam lines could be tapped off the external lines along the kiln wall.

A pigment material for which this kiln is especially suitable is prepared by a process such as that described in U. S. Patents 2,342,483 and Reissue 18,854. This pigment is concentrated from a slurry by filtration, and the filter cake containing sulfuric acid and water is forced into the kiln by means of the charging screw 15. This charge is then heated by contact with hot gases in the kiln and by contact with the hot inner walls of the kiln. The pigment temperature gradually rises, slowly at first until the evaporation processes are nearly complete, and then more rapidly as it approaches the hot discharge end of the kiln. The final temperature for this type of pigment is in the neighborhood of 1000° C. In order to prevent overburning and yet insure sufficient calcination of this product, it is preferably brought to the final stages of heat in a gradual manner. To accomplish this, the temperature of the heating gases are controlled so that they are not more than about 200° C., and preferably 100° C., higher than the final temperature of the pigment. The additional heat input from the auxiliary fuel inlet 7 is very effective in increasing the rate of removal of the water and sulfuric acid without substantially increasing the temperature differential between the hottest portion of the pigment and the combustion gases coming in contact with it. Since no additional air is admitted in the lower end where the pigment is dry, a minimum of dust entrainment occurs even at the higher capacities. There is little danger of overburning the pigment with the mid-kiln flame since the temperature of the pigment in this area is considerably below the critical temperature. Kilns of this type are found to increase production rates by as much as 25-50%. This increase in capacity is achieved without the loss of pigment quality and without increases in dust loss.

The following examples should not be construed as limiting the scope of this invention. They are merely to illustrate the advantages obtained by some of the preferred applications.

*Example I*

Figure 2:
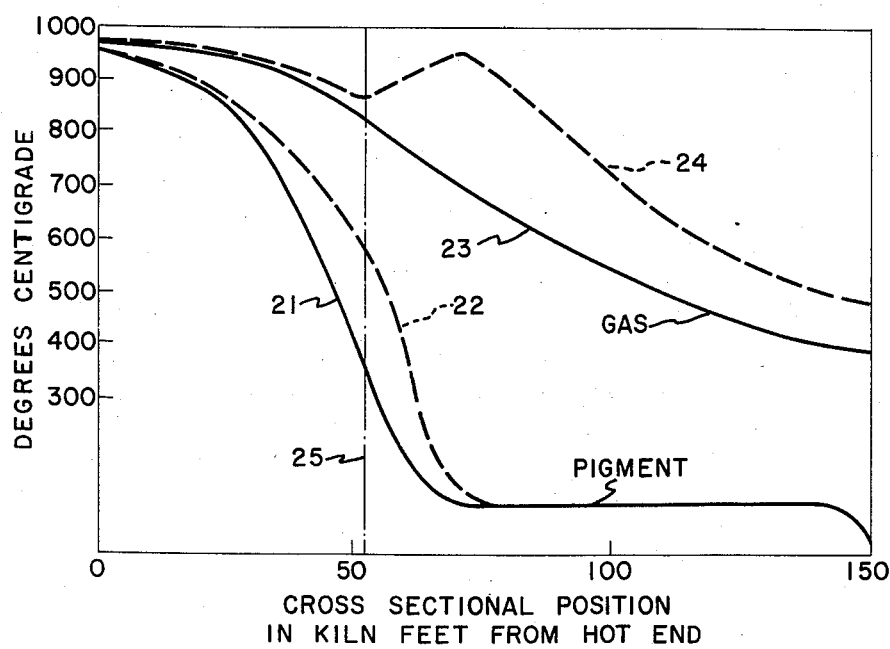

A large rotary kiln 150 ft. long and about 8 ft. in diameter of the type shown in Figure 1 was used. Prior to using my invention, the maximum quantity of anatase titanium dioxide that this kiln could satisfactorily handle was about 50 tons in a 24 hour period. The normal operation called for the use of 150 gallons per hour of Bunker C (No. 6) fuel oil in the combustion chamber along with about 160% excess of air. After the installation of this invention as shown in Figure 1, 55 ft. from the hot end of the kiln, the production level was raised to about 62 tons of high quality pigment for a 24 hour period. This was accomplished by burning 40 gals. of No. 2 fuel oil per hour while supplying 320 lbs. of steam per hour for atomization. The air supply was not changed. Under these conditions, the speed of the kiln could be increased from 1 rotation in approximately 5 minutes to 1 rotation in approximately 3½ minutes, and the aforementioned increase was obtained without affecting pigment quality. Figure 2 shows a comparison of the temperatures within the kiln with and without this invention. The temperatures are plotted against the kiln length in feet starting at the hot end. The broken vertical line 25 at 55 ft. marks the location of the auxiliary burner. The solid curves 21 and 23 show the pigment and gas temperatures of the prior art method, the gas temperature always being the higher. The temperatures achieved by application of this invention are indicated by the broken curves 22 and 24. The maximum in the upper broken curve 24 shows the effect of the auxiliary burner on the gas temperature. These temperatures were measured at points within one foot of the inner kiln wall surface, and hence do not show the higher flame temperature at the auxiliary burner. The two lower curves 21 and 22 show a remarkably similar temperature cycle for the two rates of production. This explains why this invention makes it possible to obtain the same pigment quality at a much higher production rate.

*Example II*

A kiln such as that used in Example I was used in the production of rutile titanium dioxide pigment. Without the use of this invention, this kiln was capable of producing not more than about 50 tons of pigment per day (24 hours) while consuming 150 gallons per hour of No. 6 fuel oil in the primary combustion chamber and requiring a 160% excess of air in order to prevent overburning of the pigment at the hot end. No. 2 fuel oil was supplied to the auxiliary burner located 45 ft. from the hot end, and it was atomized with approximately an equal weight of 130 lb. steam. The auxiliary burner consumed 75 gallons of fuel per hour and used about 600 lbs. per hour of steam for atomization. However, the air supply was not changed. By this procedure, it was possible to increase production to 75 tons per day while maintaining the same product quality.

The installation of an auxiliary burner operated in accordance with this invention was found to be advantageous in calcining a calcium sulfate anhydrite extender. A 150 ft. rotary kiln, similar to the one used in Example I, is operated for this purpose. When operating without the auxiliary burner, this kiln was normally capable of calcining 40 tons of anhydrite per day (24 hrs.), said anhydrite containing 65-70% of moisture. This material was calcined to a final temperature between 800-900° C. Since this pigment is not as sensitive to overcalcination as titanium dioxide, it is possible to have a temperature differential of 200° C. between the hot end gases and the final pigment. Efforts to increase the capacity of this kiln by burning more fuel in the combustion chamber and admitting extra air to keep the temperature of the pigment in the calcining range were somewhat successful. However, due to the increased gas velocity through the kiln, the heat transfer characteristics were such that an impractical amount of heat was lost to the stack. Furthermore, the high gas velocity resulted in excessive dust losses. However, if the normal amount of combustion gases and air are supplied at the hot end and an auxiliary burner used, the capacity can be increased to 60-70 tons per day without lowering pigment quality and without sustaining additional dust losses.

In Examples I and II, the percentage increase in throughput happens to be substantially equal to the percentage increase in fuel input on a volume basis. It will be found, however, that for fuels in general the percentage increase in throughput for a given feed is substantially equal to the percentage increase in heat input to the pigment. In this invention, there appears to be an advantageous increase in heat transfer to the pigment (thermal efficiency) since the stack gas temperature is not as high as would be expected. Because of this improvement in thermal efficiency, it is possible to have the percentage increase in throughput to exceed the percentage increase in fuel consumption.

Rutile titanium dioxide was also calcined on a pilot plant basis using the method and apparatus of this invention, and a 50% increase in throughput resulted.

While the invention has been illustrated with titanium dioxide and calcium sulfate, it is obvious that other materials which are normally calcined may be treated in this manner. However, my process is especially applicable to materials which tend to become overburned in a calcining or drying process. Suitable calcining temperatures for materials to be treated by this invention are well known. Although especially useful in the large scale production of anatase and rutile pigments, it is also advantageously applied to the extended titanium dioxide pigments especially those containing at least 30% TiO₂ blended with calcium sulfate, and other well known mineral extenders. The invention is also applicable to the calcination of the extenders themselves such as gypsum prepared by the method of R. W. Sullivan in U. S. Patent No. 2,549,261. This calcination may heat the sulfate to the higher temperature, e. g., 800-1000° C. to produce insoluble anhydrite; or the final temperature may be lower, e. g., down to about 200° C., to produce soluble anhydrite or hemihydrate.

In constructing the apparatus of this invention a trap may be provided for removal of the water from the steam line prior to its entrance to the burner assembly in order to avoid the danger of quenching the flame. Various expansion joints or similar devices may also be installed in the lines conducting the steam and fuel, preferably at some point outside the kiln shell. The steam and fuel could be admitted to the auxiliary burner by other means, or through other routes than shown in Figure 1. For example, the steam might be generated by an electrical heating unit attached on the outside wall of the kiln. Likewise, the fuel might be admitted to the burner from a pressurized tank mounted on the outside of the kiln. It is also possible to externally discharge the gaseous coolant rather than introduce it into the kiln. However, such methods are not considered as practical as the one shown in Figure 1.

The metal, e. g., stainless steel, sleeve placed about the burner shown at 6 in Figure 1 is preferably kept above the dew point of the gases at this location and below temperatures at which the atmospheric corrosion of the metal begins. In the calcination of titanium dioxide as shown in Examples I and II, the temperature for a metal such as 310 stainless steel or a nickel-molybdenum alloy steel usually lies between 200 and 500° C. When calcining substances that do not evolve corrosive fumes the outside jacket may not be necessary.

This invention makes it possible to increase the capacity of existing kilns at least as much as 50% without the accompanying disadvantage of poorer product quality, dust losses to the stack, or undesirably high stack temperatures. These advantages are not obtained by the application of prior art methods of burning auxiliary fuel within the kiln body. A further advantage of this invention is that it will permit a long retention time near maximum calcining temperatures. Very precisely controlled calcination schedules with surprisingly large production capacities can be obtained by the installation of one or more of the auxiliary burners herein described.

I claim:

1. In a process for calcining a pigmentary material wherein said material is passed through a horizontally inclined rotary kiln from its raised end, while passing into the low end and through said kiln, hot combustion gases and air at about the maximum gas temperature for said calcining process, the improvement which comprises introducing a fluid fuel in an amount less than the chemical equivalent of the oxygen in said combustion gases and air into the interior gas space of said kiln where the pigment temperature is substantially below maximum, and burning said fuel in an axially positioned flame maintained in said gas space with a portion of the oxygen in the gas stream.

2. In a process for calcining heat sensitive pigmentary material wherein said material is passed through a horizontally inclined rotary kiln from its raised end, while passing into the low end and through said kiln, hot combustion gases and air at about the maximum gas temperature for said calcining process, the improvement which comprises introducing a fluid fuel in an amount less than the chemical equivalent of the oxygen in said combustion gases and air through a fluid cooled, jacketed line into the interior gas space of said kiln at a point adjacent to which the pigment temperature is substantially below maximum and burning said fuel in an axially positioned flame maintained in said gas space with a portion of the oxygen in the passing kiln gas stream.

3. In a process for calcining heat sensitive pigmentary material wherein said material is passed through a horizontally inclined rotary kiln from its raised end, while passing into the low end and through said kiln, hot combustion gases and air at about the maximum gas temperature for said calcining process, the improvement which comprises introducing a fluid fuel in an amount less than the chemical equivalent of the oxygen in said combustion gases and air through a conduit jacketed with a gaseous coolant into the interior gas space of said kiln at a point adjacent to which the pigment temperature is substantially below maximum and burning said fuel in an axially positioned flame maintained in said gas space with a portion of the oxygen in the passing kiln gas stream, said gaseous coolant being mixed with said fluid fuel as they enter said kiln gas space from said conduit.

4. In a process for calcining heat sensitive pigmentary material wherein said material is passed through a horizontally inclined rotary kiln from its raised end, while passing into the low end and through said kiln, hot combustion gases and air at about the maximum gas temperature for said calcining process, the improvement which comprises introducing a fluid fuel in an amount less than the chemical equivalent of the oxygen in said combustion gases and air through a conduit jacketed with steam into the interior gas space of said kiln at a point adjacent to which the pigment temperature is substantially below maximum and burning said fuel in an axially positioned flame maintained in said gas space with a portion of the oxygen in the passing kiln gas stream, said steam being mixed with said fluid fuel as they enter said kiln gas space from said conduit.

5. In a method for calcining heat sensitive pigmentary material in a non-reducing atmosphere in a horizontally inclined, tubular, rotary kiln in which raw feed stock is continuously fed into the raised end of said kiln, and discharged from the low end, said low end being in communication with a combustion chamber in which hydrocarbon fuel is burned in air, and the resulting combustion products together with an excess of air introduced into the low end of the kiln at about the maximum gas temperature for said calcining process, the quantity of said excess air being from 125–175% of that which is theoretically required to burn said fuel, the improvement which comprises introducing additional fluid hydrocarbon fuel into the gas space of said kiln where the pigment temperatures are substantially below maximum, and burning said fuel in an axially positioned flame maintained in said gas space with the oxygen in the passing gas stream, said fuel being introduced and burned in amounts sufficient to supply up to 100% of the heat output of the fuel burned in the communicating combustion chamber at the low end of said kiln.

6. In a method for calcining heat sensitive pigmentary material in a non-reducing atmosphere in a horizontally inclined, tubular, rotary kiln in which raw feed stock is continuously fed into the raised end of said kiln and discharged from the low end, said low end being in communication with a combustion chamber in which a hydrocarbon fuel is burned in air, and the resulting combustion products together with an excess of air introduced into the low end of the kiln at about the maximum gas temperature for said calcining process, the quantity of said excess air being from 125–175% of that which is theoretically required to burn said fuel, the improvement which comprises introducing a fluid hydrocarbon fuel and a gaseous coolant into an axially positioned flame maintained in the gas space of said kiln where the pigment temperature is substantially below maximum, said gaseous coolant passing through a jacket about the fuel line within the kiln and mixing with and atomizing said fluid fuel upon entering said gas space, and burning said fluid hydrocarbon fuel with the oxygen in the passing gas stream, said fuel being introduced and burned in an amount sufficient to supply up to 100% of the heat output of the fuel burned in the communicating combustion chamber at the low end of said kiln.

7. The process of claim 6 wherein the fluid coolant is steam.

8. The process of claim 7 wherein the pigmentary material is a titanium dioxide pigment.

9. In a horizontally inclined, rotary tubular kiln having an open upper end through which kiln feed stock may be introduced and heating gases discharged, and having an open lower end through which oxygen-containing heating gases are introduced and the calcined product discharged, the improvement which comprises two concentric conduits, the inner conduit communicating with a source of fluid fuel outside the kiln wall and the outside conduit communicating with a source of gaseous coolant outside the kiln wall, said concentric conduits passing through the wall of said kiln and communicating with a mixing nozzle at their termini within said calcining space, said concentric conduits having an outside jacket of a corrosion resistant material mounted to the kiln wall and enclosing an air space about the outer concentric conduit from the plane at which said conduits pass through the kiln wall to a plane in close proximity to the connection between said conduit and said mixing nozzle, said jacket being in sealed contact with the enclosed conduits at the terminus of said jacket which is within said kiln.

10. In a horizontally inclined, rotary, tubular kiln having an open upper end through which kiln feed stock may be introduced and heating gases discharged, and having an open lower end through which oxygen-containing heating gases are introduced and the calcined product discharged, the improvement which comprises a steam line communicating with a source of steam supply through a rotary seal and extending from said seal towards said kiln at its upper end along the longitudinal axis of the latter, said steam line passing through a second rotary seal at which it becomes enclosed by an outer concentric line which communicates with a source of supply of a fluid fuel at said second rotary seal, the concentric steam and fuel lines extending along the longitudinal axis of and toward said kiln and passing through a third rotary seal at which said steam and fuel lines become enclosed by an outer concentric line which communicates with a source of supply of water, the concentric steam, fuel and water conduits extending along the longitudinal axis of and into said kiln, said concentric conduits then bending and passing through the kiln wall and again bending and extending longitudinally along the outside wall toward the low end of said kiln, said concentric conduits separating into individual conduits, the water conduit communicating with a circumferential trough which in turn communicates with a drain, said fuel and steam lines extending longitudinally along said kiln and becoming concentric conduits with the steam line being the outer conduit, said concentric fuel and steam conduits passing through the wall and communicating with a mixing nozzle at their termini within the gas space of said kiln, said conduits having an outside jacket of a corrosion resistant material mounted to the kiln wall and enclosing an air space about the outer concentric conduit from the plane at which said conduits pass through the kiln wall to a plane in close proximity to the connection between said conduit and said mixing nozzle, said jacket being in sealed contact with the enclosed conduits at the terminus of said jacket which is within said kiln.

References Cited in the file of this patent

UNITED STATES PATENTS

| | | |
|---|---|---|
| 1,669,476 | Landers | May 15, 1928 |
| 1,791,403 | De Buch | Feb. 3, 1931 |
| 1,976,162 | De Buch | Oct. 9, 1939 |
| 2,557,528 | Andrews | June 19, 1951 |

FOREIGN PATENTS

| | | |
|---|---|---|
| 89,131 | Austria | Aug. 10, 1922 |